(12) United States Patent
Hwang

(10) Patent No.: US 6,865,630 B2
(45) Date of Patent: Mar. 8, 2005

(54) APPARATUS AND METHOD OF PREVENTING CONGESTION IN MESSAGE TRANSMISSION SYSTEM

(75) Inventor: Chan Sik Hwang, Seoul (KR)

(73) Assignee: LG Electronics, Inc., Seoul (KR)

( * ) Notice: Subject to any disclaimer, the term of this patent is extended or adjusted under 35 U.S.C. 154(b) by 447 days.

(21) Appl. No.: 10/026,776

(22) Filed: Dec. 27, 2001

(65) Prior Publication Data

US 2002/0087767 A1 Jul. 4, 2002

(30) Foreign Application Priority Data

Dec. 29, 2000 (KR) ........................................ P2000-86398

(51) Int. Cl.[7] .............................................. G06F 13/14
(52) U.S. Cl. ...................................... 710/113; 710/116
(58) Field of Search ................................ 710/110, 111, 710/113, 116–118

(56) References Cited

U.S. PATENT DOCUMENTS

| | | | | |
|---|---|---|---|---|
| 6,122,690 A | * | 9/2000 | Nannetti et al. | ............ 710/311 |
| 6,173,349 B1 | * | 1/2001 | Qureshi et al. | ............ 710/110 |
| 6,212,589 B1 | * | 4/2001 | Hayek et al. | ............... 710/119 |
| 6,671,784 B2 | * | 12/2003 | Lee | ............................. 711/151 |

* cited by examiner

*Primary Examiner*—Glenn A. Auve
(74) *Attorney, Agent, or Firm*—Fleshner & Kim, LLP

(57) ABSTRACT

An apparatus and a method of arbitrating access to a common bus, for a first set of modules included in a message transmission system, are disclosed. Using the apparatus and method of the present invention, each module is able to send an access requesting signal to an access arbiter, only after its predetermined standby period is expired. The method includes setting a standby period of each module, identifying a second set of modules whose standby periods are determined to be expired, and allowing each of the second set of modules to send an access requesting signal. Therefore, each module of the system can avoid any message traffic congestion and, consequently, the stability of the whole system can be greatly enhanced.

22 Claims, 4 Drawing Sheets

FIG. 5

| Address (n) | Pn | In | P-counter | I-counter |
|---|---|---|---|---|
| 0 | x | x | x | x |
| 1 | x | x | x | x |
| 2 | x | x | x | x |
| ⋮ | ⋮ | ⋮ | ⋮ | ⋮ |
| N | x | x | x | x |

APPARATUS AND METHOD OF PREVENTING CONGESTION IN MESSAGE TRANSMISSION SYSTEM

BACKGROUND OF THE INVENTION

This application claims the benefit of Korean Application No. P2000-86398, filed on Dec. 29, 2000, which is hereby incorporated by reference.

1. Field of the Invention

The present invention relates to a message transmission system and, more particularly, to an apparatus and method of preventing data traffic congestion in a message transmission system.

2. Background of the Related Art

In general, a bus access arbiter, of a master module, arbitrates bus access for transmitting a message from one functional module to another module, in a message transmission system of a private branch exchange system. Additionally, the message is transmitted through a Frame Synchronous (S) signal, which is generated by a master bus controller. The system is able to provide both a serial and a parallel message transmission method.

FIG. 1 illustrates a message transmission system of a background art, private branch exchange system. The system includes a master module 20 and N slave modules 30_1, 30_2, ..., 30_N. The master module 20 and all of the slave modules are connected to the common bus (CB) 5 and the control line (CL) 10.

There are two ways for the module to connect to the CB 5, a serial line (SL) connection and a parallel line (PL) connection. The SL connection uses only one of the CB lines, and the PL connection uses all of the CB lines. The master module 20 is connected to all of the CB lines. Each of the N slave modules can be connected to the CB 5 using the SL or PL connection. The CL 10 includes a clock signal, a parity error signal, a busy signal, a frame synchronization signal, and many other signals.

Similar to the slave modules 30_1-30_N, the master module 20 can make a request for message transmission and is included in a node to communicate a message. Additionally, the master module 20 arbitrates access to the CB 5. The master module 20 shown in FIG. 1 includes a master bus controller 21, a CPU 22, and a shared memory 23, as shown in FIG. 2.

The master bus controller 21 includes a serial/parallel controller 21_1, a message transmitting/receiving controller 21_2, a memory arbiter 21_3, and a bus request arbiter 21_4. In addition, the bus request arbiter 21_4 includes an access authorizing block 21_4a and a request storage 21_4b, as shown in FIG. 3.

Reference will now be made in detail to the method of operating the message transmission system of the background art, private branch exchange system. We know that only one node may use the CB 5 for a given period of time. Therefore, a node must initially obtain a right to access the CB 5, to send a message to another node through the CB 5.

The bus request arbiter 21_4, of the master bus controller 21 shown in FIG. 2, receives an access-requesting signal from each module shown in FIG. 1. Based on this signal, the bus request arbiter 21_4 provides a selected module access to the CB 5.

The request storage 21_4b, of the bus request arbiter 21_4 shown in FIG. 3, stores the access requesting signals, sent by the access requesting modules, in the order that they are received in a given period of time. After all the requesting signals are stored in the request storage 21_4b, the access authorizing block 21_4a gives a bus access approval to a node, which is selected using a given selecting rule.

In addition, the master bus controller 21 provides frame synchronization and clock signals to the slave modules, which they use to send or receive information. Therefore, the slave modules are able to receive the data provided through the CB 5 and determine whether their access request is approved.

When the master bus controller 21 approves the access request of a node, the transmitting node transmits a node number of the receiving node. Thereafter, the receiving node sends information regarding its preferred receiving method to the master module 20, through the CB 5. Then, master module 20 informs the transmitting module of the preferred method. Finally, the transmitting module transmits the message to the receiving module, using the preferred message transfer method (i.e., a serial or parallel transfer method).

However, this method of transmitting a message in a message transmission system of the background art, private branch exchange has several disadvantages. If there is only one node sending an access-requesting signal, the master bus controller 21 gives an access right immediately after it receives the requesting signal. Then, the node may use all of the bandwidth of the bus. In this case, data traffic congestion may occur in the node. Even a single slave node, having such congestion, may cause the whole system to be unstable.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method of preventing data traffic congestion in a message transmission system.

A further object of the present invention is to prevent traffic congestion by arbitrating access to a common bus so that each module is able to send an access requesting signal only after its previously set standby period has expired.

To achieve these objects and other advantages and in accordance with the purpose of the invention, as embodied and broadly described herein, a method of arbitrating access to a common bus for a first set of modules included in a message transmission system includes (a) setting a standby period of each of the first set of modules, (b) identifying a second set of modules whose standby periods are determined to be expired, and (c) allowing each of the second set of modules to send an access-requesting signal.

The method further includes (d) selecting a final module among the second set of modules, using a given selecting rule and (e) sending an acknowledgment signal to the selected final module.

In another aspect of the present invention, a method of arbitrating access to a common bus, for a first set of N modules included in a message transmission system, includes (a) setting $P_n$ to an initial prescaler value and setting $I_n$ to an initial interval value of an nth module, where n=1, 2, 3, ... N, and $P_n$ and $I_n$ represent a standby period for the nth module; (b) identifying a second set of modules whose standby periods are determined to be expired using $P_n$ and $I_n$; and (c) allowing each of the second set of modules to send an access-requesting signal.

In addition, the method further includes (d) selecting a final module, among the second set of modules using a given selecting rule, and (e) sending an acknowledgment signal to the selected final module.

Step (b) may include (b1) down-counting $P_1$ of a first module, for every first period, and determining whether $P_1$ is equal to a first predetermined value; (b2) down-counting $I_1$ of the first module, for every second period, and determining whether $I_1$ is equal to a second predetermined value, if it is determined in step (b1) that $P_1$ is equal to the first predetermined value.

Step (b) may further include (b3) treating the first module as one of the second set of modules, if it is determined in the step (b2) that $I_1$ is equal to the second predetermined value, and (b4) performing steps (b1) to (b3) for the $2^{nd}$, $3^{rd}$, $4^{th}$, . . . , Nth modules.

In another aspect of the present invention, an apparatus for arbitrating access to a common bus, for a first set of modules included in a message transmission system, includes a standby period storage storing a standby period of each of the first set of modules; an access authorizing block identifying a second set of modules whose standby periods are determined to be expired and allowing each of the second set of modules to send an access-requesting signal; and a request storage storing an access request made by each of the second set of modules.

The objects of the invention may be further achieved in whole or in part by a method of arbitrating access to a common bus shared by a plurality of modules, including assigning a first value and a second value to each of the plurality of modules; repeatedly decreasing the first value until the first value meets a first condition, for each of the plurality of modules; decreasing the second value and determining whether the second value meets a second condition, for each of the plurality of modules having a corresponding first value that meets the first condition; and transmitting an access request to a bus arbiter, requesting access to the common bus, from each of the plurality of modules having a corresponding second value that meets the second condition.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 illustrates an interval value table included in the interval value storage, shown in FIG. 4.

DETAILED DESCRIPTION OF PREFERRED EMBODIMENTS

Figure 1:
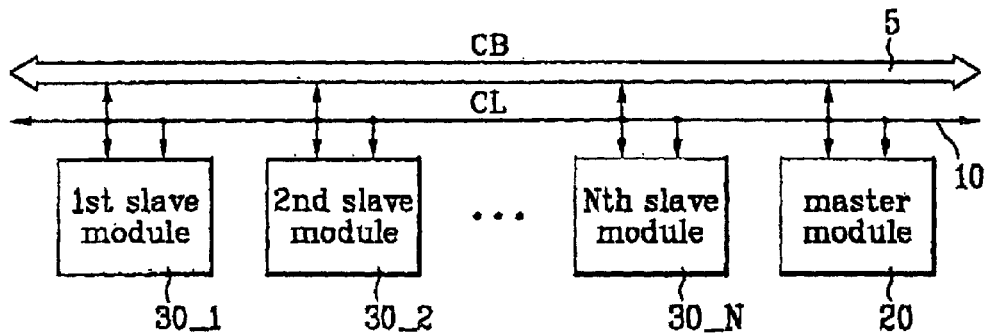
FIG. 1 illustrates a message transmission system of a background art, private branch system.
Figure 2:
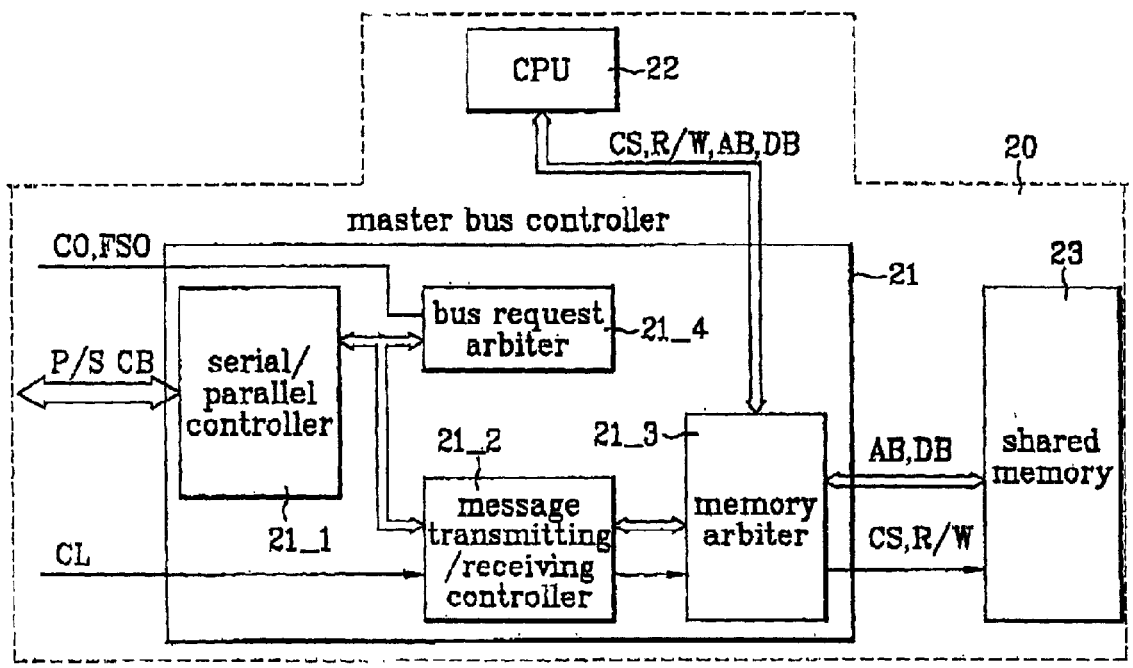
FIG. 2 illustrates the master module, shown in FIG. 1, in greater detail.
Figure 3:
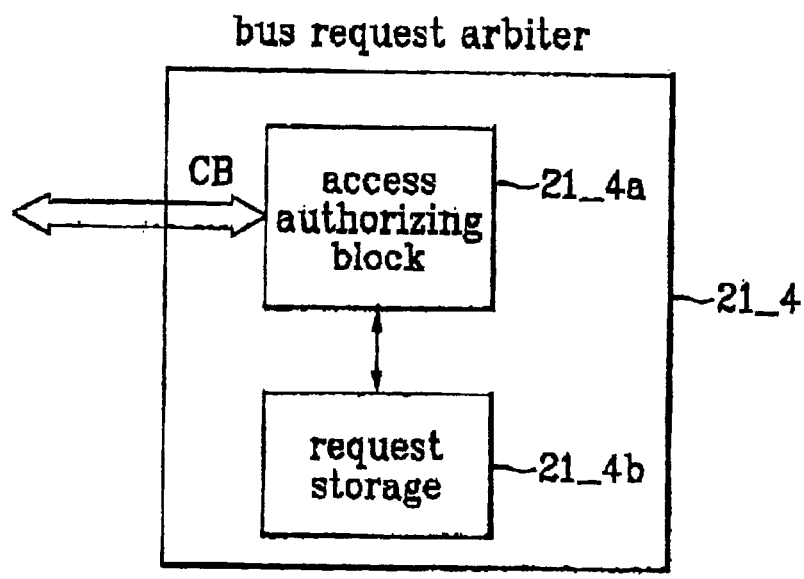
FIG. 3 illustrates the bus request arbiter, shown in FIG. 2, in greater detail.
Figure 4:
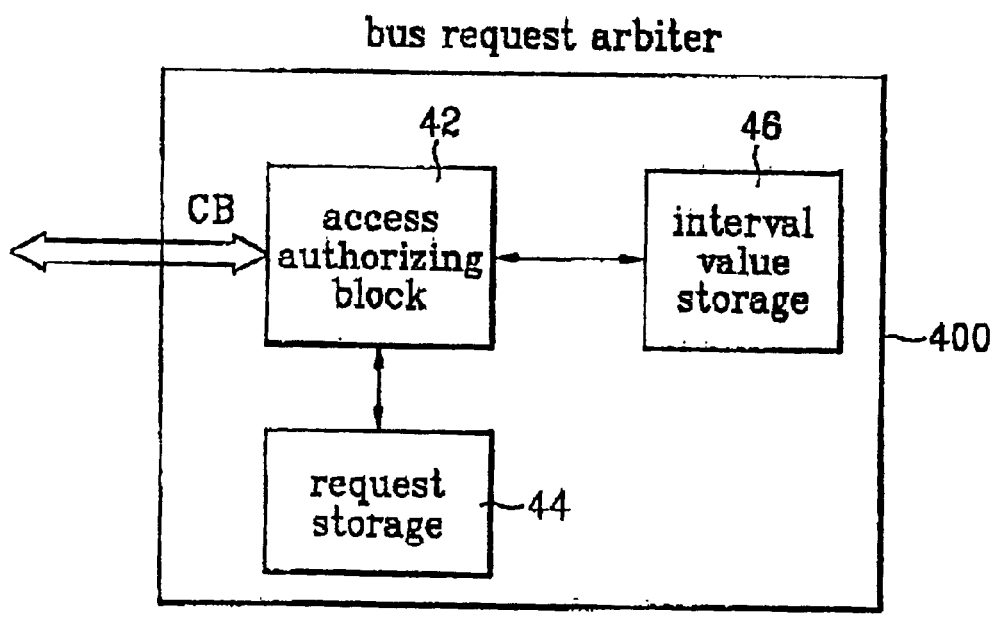
FIG. 4 illustrates a bus request arbiter included in a master bus controller of the present invention.

FIG. 4 illustrates a bus request arbiter 400, included in a master bus controller of the present invention. The bus request arbiter 400 includes an access-authorizing block 42, a request storage 44, and an interval value storage 46.

The interval value storage 46 stores a prescaler value $P_n$ and an interval value $I_n$ of an $n^{th}$ slave module. Both values, which are initially set by a user for each slave module, are used to stop the respective slave module from re-accessing the common bus before its given standby period has expired. The interval value storage 46 contains an interval value table that stores an address of the $n^{th}$ slave module, $P_n$, $I_n$, a P-counter, and an I-counter, for each slave module. The table is shown in FIG. 5.

The access-authorizing block 42 reads $P_n$ and $I_n$ of each slave module, stored in the interval value storage 46, and determines whether a given standby period has expired for the respective slave module, by down-counting the stored values of $P_n$ and $I_n$.

The request storage 44 stores the access requesting signals, which are sent by each access requesting module, in the order that they are received, for a given period of time.

Figure 6:
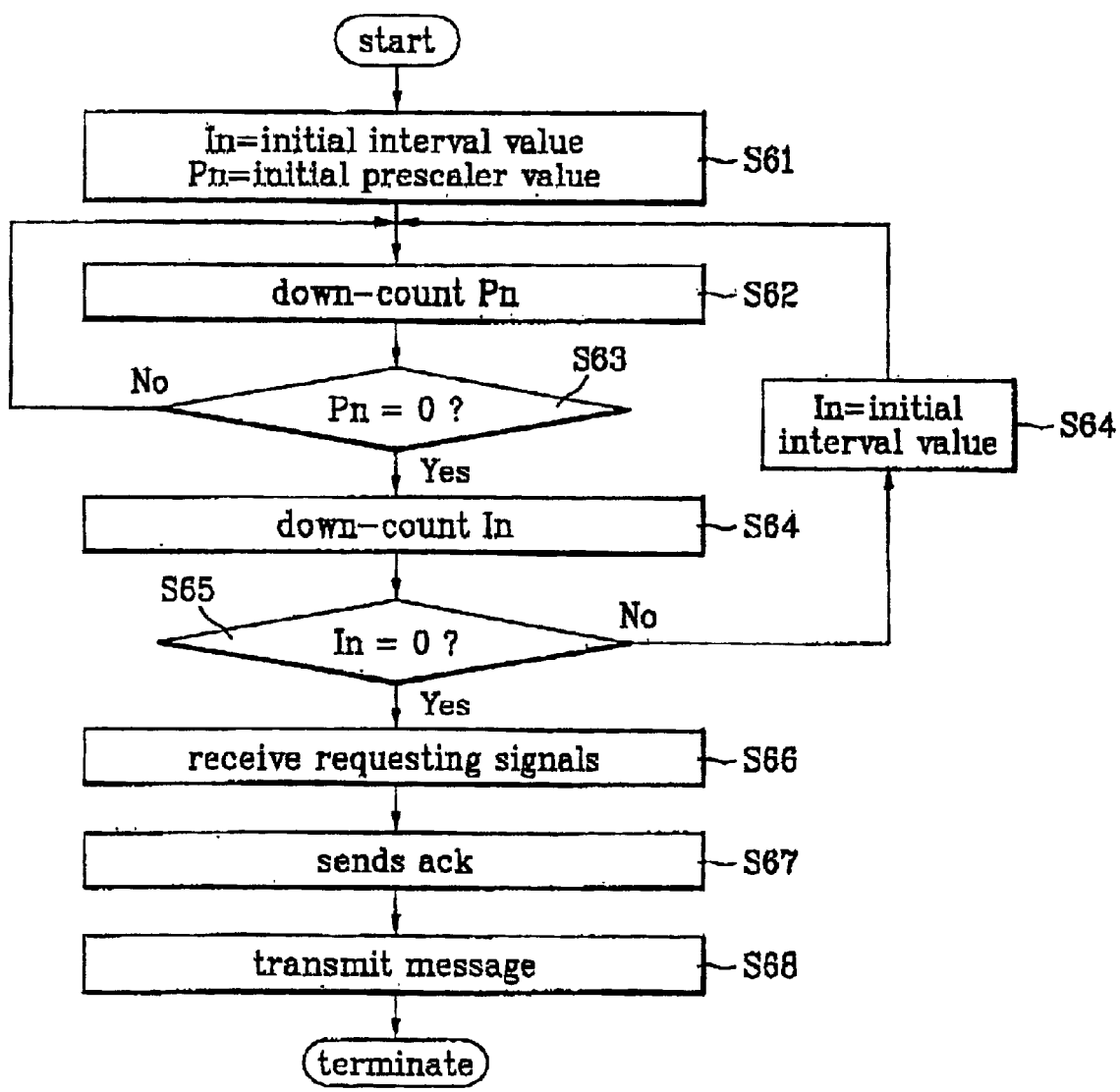
FIG. 6 illustrates a method of arbitrating access to a common bus, for a set of modules included in a message transmission system, according to the present invention.

FIG. 6 illustrates a method of arbitrating access to a common bus (CB), for slave modules included in a message transmission system of the present invention. The access-authorizing block 42 identifies a set of slave nodes, whose predetermined standby periods are expired, among the original set of slave nodes that may access the CB. The access authorizing block 42 accomplishes this by performing steps S61 to S65, as described below, for each of the originally identified set of slave nodes.

A system user initially sets $P_n$ and $I_n$ for a slave module (S61). If the interval value $I_n$ of a slave module is set to zero, the access-authorizing block 42 will not give an access right to the slave module.

Next, the access authorizing block 42 reads the prescaler and interval values of the slave module and stores the values in its built-in memory. Then, the access authorizing block 42 down-counts the stored prescaler value for every given period (S62). Thereafter, the access authorizing block 42 checks whether the down-counted prescalet value is zero (S63), and it repeats step S62 until the down-counted prescaler value becomes zero. When it is finally determined, in step S63, that the prescaler value is zero, the access authorizing block 42 down-counts the interval value stored in the built-memory (S64).

Next, the access authorizing block 42 checks whether the down-counted interval value is zero (65). If it is not, access authorizing block 42 re-accesses the interval value storage 46 and resets its current prescaler value, stored in the built-in memory of the access authorizing block 42, to the original prescaler value stored in the interval value storage 46. Then, the access authorizing block 42 repeats steps S62 to S65 until the interval value becomes zero.

When it is finally determined, in step S65, that the interval value is zero, the access-authorizing block 42 allows the slave module to send an access requesting signal.

After the access-authorizing block 42 performs steps S61 to S65, for each of the slave nodes that may access the CB, it receives the access-requesting signals from those slave modules whose predetermined standby periods are expired. Then, the access authorizing block 42 performs an arbitration process, based on a given arbitrating rule (e.g., a round robin method) (S66). The access authorizing block 42 selects a slave module using the arbitration rule (S67), and the selected slave module sends a message through the CB (S68).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of arbitrating access to a common bus, comprising:
   (a) setting a prescribed standby period for each of a first set of modules;
   (b) identifying a second set of modules, among the first set of modules, whose actual standby periods have reached the corresponding prescribed standby periods; and
   (c) allowing each of the second set of modules to send a request to access the common bus.

2. The method of claim 1, wherein the prescribed standby period for each of the first set of modules is set by a system user and is stored in a message transmission system.

3. The method of claim 1, further comprising:
   (d) selecting a final module, among the second set of modules, using a selecting rule; and
   (e) sending an acknowledgment signal, to the selected final module, granting access to the common bus.

4. The method of claim 3, wherein the selecting rule is a round robin method.

5. The method of claim 1, wherein the equivalency of the actual standby period and the prescribed standby period, for each of the first set of modules, indicates that a corresponding standby period has expired.

6. A method of arbitrating access to a common bus, comprising:
   (a) setting an initial value of a prescaler and an initial value of an interval, for each of a first set of modules, wherein an arithmetic product of the initial prescaler value and the initial interval value, of each of the first set of modules, represents a prescribed standby period for the respective module;
   (b) identifying a second set of modules whose respective actual standby periods have reached the prescribed standby periods; and
   (c) allowing each of the second set of modules to send a request to access the common bus.

7. The method of claim 6, wherein the initial prescaler value and the initial interval value, for each of the first set of modules, are set by a system user and are stored in a message transmission system.

8. The method of claim 6, further comprising:
   (d) selecting a final module, among the second set of modules, using a selecting rule; and
   (e) sending an acknowledgment signal, to the selected final module, granting access to the common bus.

9. The method of claim 8, wherein the selecting rule is a round robin method.

10. The method of claim 6, wherein the identifying step (b) further comprises:
    (b1) reducing the prescaler value, corresponding to each of the first set of modules, and determining whether the reduced prescaler value is equal to a first predetermined value, for every transpiring first period;
    (b2) reducing the interval value, corresponding to each of the first set of modules, and determining whether the reduced interval value is equal to a second predetermined value, for every transpiring second period, if it is determined in step (b1) that the reduced prescaler value is equal to the first predetermined value; and
    (b3) associating each of the first set of modules, having a corresponding interval value equal to the second predetermined value, as a member of the second set of modules.

11. The method of claim 10, further comprising resetting the reduced prescaler value to the initial prescaler value and repeating step (b1), if it is determined in step (b2) that the reduced interval value is not equal to the second predetermined value.

12. The method of claim 6, wherein the equivalency of the actual standby period and the prescribed standby period, for each of the first set of modules, indicates that a corresponding standby period has expired.

13. An apparatus for arbitrating access to a common bus, comprising:
    a standby period storage device that stores a standby period of each of a first set of modules;
    an access authorizing block that identifies a second set of modules whose standby periods are determined to be expired and allows each of the second set of modules to send a request to access the common bus; and
    a request storage device that stores the access request made by each of the second set of modules.

14. The apparatus of claim 13, wherein the standby period of each of the first set of modules is initially set by a system user.

15. The apparatus of claim 13, wherein the access authorizing block selects a final module, among the second set of modules, using a selecting rule and sends an acknowledgment signal to the selected final module granting access to the common bus.

16. The apparatus of claim 15, wherein the selecting rule is a round robin method.

17. A method of arbitrating access to a common bus shared by a plurality of modules, comprising:
    assigning a first value and a second value to each of the plurality of modules;
    repeatedly changing the first value until the first value meets a first condition, for each of the plurality of modules;
    changing the second value and determining whether the second value meets a second condition, for each of the plurality of modules having a corresponding first value that meets the first condition; and
    transmitting an access request to a bus arbiter, requesting access to the common bus, from each of the plurality of modules having a corresponding second value that meets the second condition.

18. The method of claim 17, further comprising:
    reassigning the first value to an initial value, for each of the first modules having a corresponding second value that is determined not to meet the second condition;
    repeatedly changing the first value until the first value meets the first condition, for each of the plurality of modules;
    changing the second value and determining whether the second value meets the second condition, for each of the plurality of modules having a corresponding first value that meets the first condition; and
    transmitting the access request to the bus arbiter, requesting access to the common bus, from each of the plurality of modules having a corresponding second value that meets the second condition.

19. The method of claim 18, further comprising:
    prioritizing the access requests received from the plurality of modules, according to a prioritization scheme; and
    providing the plurality of modules access to the common bus, according to the prioritization scheme.

20. The method of claim 19, wherein the prioritization scheme is a round robin scheme.

21. The method of claim 17, wherein the bus arbiter provides both parallel and serial communication access to the common bus.

22. The method of claim 17, wherein each of the plurality of modules is separately assigned variable initial values for the first and second values.

* * * * *